(12) United States Patent
Hallaczek et al.

(10) Patent No.: US 12,387,010 B2
(45) Date of Patent: Aug. 12, 2025

(54) SYSTEM FOR PROVIDING A PLURALITY OF FUNCTIONS FOR A DEVICE, IN PARTICULAR FOR A VEHICLE

(71) Applicant: Robert Bosch GmbH, Stuttgart (DE)

(72) Inventors: Felix Hallaczek, Stuttgart (DE); Alexander Kaucher, Ulm (DE); Manuel Jauss, Wissgoldingen (DE); Marcel Kneib, Ingelheim (DE); Nils Benecke, Ludwigsburg (DE); Razvan Florin Aguridan, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 193 days.

(21) Appl. No.: 18/304,070

(22) Filed: Apr. 20, 2023

(65) Prior Publication Data
US 2023/0367910 A1 Nov. 16, 2023

(30) Foreign Application Priority Data

May 13, 2022 (DE) .................... 10 2022 204 714.1

(51) Int. Cl.
*G06F 21/00* (2013.01)
*G06F 21/62* (2013.01)

(52) U.S. Cl.
CPC ................................ *G06F 21/629* (2013.01)

(58) Field of Classification Search
None
See application file for complete search history.

(56) References Cited

U.S. PATENT DOCUMENTS

| | | | |
|---|---|---|---|
| 10,127,161 B2 * | 11/2018 | Wegner | G06F 11/0724 |
| 11,374,785 B2 * | 6/2022 | Lerzer | B64D 11/0015 |
| 2014/0123299 A1 * | 5/2014 | Jung | G06F 21/62 726/26 |
| 2018/0196439 A1 * | 7/2018 | Levinson | B60W 60/0027 |
| 2019/0238555 A1 * | 8/2019 | Buffard | H04L 9/3297 |
| 2020/0242247 A1 * | 7/2020 | Morita | G06F 11/0763 |
| 2023/0356748 A1 * | 11/2023 | Hetang | G05B 13/0265 |

* cited by examiner

*Primary Examiner* — Maung T Lwin
(74) *Attorney, Agent, or Firm* — NORTON ROSE FULBRIGHT US LLP

(57) ABSTRACT

A computer system for providing a plurality of functions for a device, in particular for a vehicle. The computer system has a plurality of system modules configured to provide functions that are differently critical for the operational security of the device. Each system module or a part of a system module is assigned to one zone of a plurality of zones, a zone being a logically and/or physically delimitable unit in the computer system. A first zone is more trustworthy than a second, less trustworthy zone, the danger of a manipulation of a more trustworthy zone being less than of a less trustworthy zone. A first, more critical function being provided by a system module of the first zone and a less critical function being provided by a system module of the second zone.

17 Claims, 4 Drawing Sheets

SYSTEM FOR PROVIDING A PLURALITY OF FUNCTIONS FOR A DEVICE, IN PARTICULAR FOR A VEHICLE

CROSS REFERENCE

The present application claims the benefit under 35 U.S.C. § 119 of German Patent Application No. DE 10 2022 204 714.1 filed on May 13, 2022, which is expressly incorporated herein by reference in its entirety.

BACKGROUND INFORMATION

The demand for "smarter mobility" implies the integration of the vehicle into the digital world. Expanded security features and the enabling of fully autonomous systems require significantly more computing power than in previous systems. Further, consumer electronics are merging with the classic vehicle. Networking the vehicles with each other and/or with a backend situated in a cloud increases the number of necessary interfaces and thus the attack surface for external attacks on the IT system of the vehicles. As a result, cybersecurity is playing an increasingly important role in the software and hardware development of today's vehicles. As vehicles become increasingly networked, the potential for damage increases, as entire fleets of vehicles can be exposed to cyberattacks simultaneously and regardless of location.

Previous E/E architectures are based on the idea of being easily integratable and producible in modular fashion. They are constructed in a flat hierarchy and are made up of function-specific electronic control units (ECUs) that are interconnected directly or via gateways. In this context, the gateway can ensure the communication between the various interfaces and can monitor the data traffic. In recent years, the number of control devices required has increased, resulting in a large number of overlapping functions. Novel functions increase the complexity and the need for interaction between several control devices. The latter in particular leads to problems with regard to the development of control devices by different manufacturers. The trend is therefore towards a centralized E/E architecture, in which application areas (e.g. multimedia/cockpit, power train, . . . ) are merged with one another. The goal here is a vehicle-unified E/E architecture with a central vehicle computer, the central vehicle computer being logically and physically divided into zones within, which is known as a zone-based E/E architecture.

By unifying different areas, each with its own security requirements, in one or a few computing units, functions are no longer separated from each other in terms of hardware (for example as was previously the case given physical separation of a control device for controlling braking functions). For example, as soon as an area having a high level of connectivity to the outside is compromised by external intervention (manipulation), there is a risk of manipulation of other functions as well, which can for example have an effect on operational security and can cause hazardous situations. Therefore, there is a need to increase operational security in architectures with central vehicle computers.

SUMMARY

A first general aspect of the present invention relates to a computer system for providing a plurality of functions for a device, in particular for a vehicle. According to an example embodiment of the present invention, the computer system having a plurality of system modules and the plurality of system modules being configured to provide functions that are differently critical for the operational security of the device, each system module or a part of a system module of the plurality of system modules being assigned to one zone of a plurality of zones, a zone being a logically and/or physically delimitable unit in the computer system, a first zone of the plurality of zones being more trustworthy than a second, less trustworthy zone of the plurality of zones, the danger of a manipulation of a more trustworthy zone being less than of a less trustworthy zone, and a first more critical function of the plurality of functions being provided by a system module of the first zone and a less critical function of the plurality of functions being provided by a system module of the second zone.

The present invention also relates to a computer-implemented method for enforcing a zone separation in a computer system for providing a plurality of functions for a device, in particular for a vehicle. According to an example embodiment of the present invention, the computer system has a plurality of system modules and a plurality of system resources, and the plurality of system modules carry out functions that are differently critical for the operational security of the device. The method includes assigning each system module, or a part of a system module of the plurality of system modules, to a zone of the plurality of zones, a zone being a logically and/or physically delimitable unit in the computer system, and a first zone being more trustworthy than a second, less trustworthy zone, wherein the danger of a manipulation of a trustworthy zone is less than of a less trustworthy zone, and a first more critical function of the plurality of functions is provided by a system module of a first zone and a less critical function of the plurality of functions is provided by a system module of a second zone, dividing at least one zone of the plurality of zones into at least two subzones, assigning a part of each of the one or more system modules of the corresponding zone to the subzones, and assigning access rights to system resources to the zones and/or subzones, system resources including peripheral devices and/or memory devices of the system.

The system provided in the present disclosure according to the first general aspect (or a specific embodiment thereof) of the present invention enables the consolidation of different domains with security and safety classification in one computer system, e.g., a vehicle computer. This can reduce a potential attack surface due to centralization. By logically and/or physically dividing the computer system (e.g., vehicle computer) into zones and separating them, a greater differentiation of the security requirements for the respective zones can be realized. For example, zones that have high relevance for operational security can be separated from functions that are less relevant for operational security but more susceptible to external interventions or manipulation, for example in the context of a cyberattack. Separating the zones can further reduce the probability of a successful manipulation in one zone spreading to other zones. The assignment of access rights to system resources and their implementation according to the principle of least privilege can be simplified by centralizing the functions on the computer system (e.g., vehicle computer) and by the zone separation, as can their protection against harmful manipulation. Enabling a centralized zone-based E/E architecture while maintaining the required security requirements enables a reduction in complexity due to a reduced number of computing units in the vehicle, which can lead to savings in costs, weight, and energy.

Some terms are used in the present disclosure as follows:

A "zone" can be a logically (functionally) and/or physically (locally) delimitable unit in a system. A zone can include one or more system modules and/or a part and/or parts of a system module or of a plurality of system modules. A zone can be defined, that is determined, by its components. All system modules or parts of system modules assigned to a zone can form the zone. A zone can include various computing units, computing cores, controllers, control units, storage units, peripheral devices, communication interfaces, network components, software applications, software architectures, etc., and/or all other software and/or hardware components, or parts of the above-named. A plurality of zones can form an overall system.

A "subzone" can be a logically (functionally) and/or physically (locally) delimitable subunit of a zone. A zone can be divided into at least two subzones. A subzone can include parts of the system modules that are assigned to the corresponding zone. A subzone can here include various computing units, computing cores, controllers, control units, storage units, peripheral devices, communication interfaces, network components, software applications and/or software architectures, etc., and/or all other software and/or hardware components, or parts of the named, that are contained in the subdivided zone. All subzones of a zone can form the zone.

A "system module" can include a hardware and/or software unit that provides a plurality of functions. A system module can include one or more processors, controllers, control units, (communication) interfaces, network components, software applications, software architectures, etc., and/or all other software and/or hardware components, or parts of the above-named. A system module can be situated in a zone or in a subzone.

A "software architecture" can be a structured and/or hierarchical configuration of the system components as well as a description of their relationships in a software system, where system components can be software parts whose relationships to each other and whose properties can be described by the software architecture. For example, the software architecture of "AUTOSAR" (Automotive Open System Architecture) is an open and standardized software architecture for electronic control units (ECUs) in the automotive sector. For example, the "AUTOSAR Classic Platform" and the "AUTOSAR Adaptive Platform" are two different software architectures.

A "system resource" can be a software and/or hardware component that provides services for system modules. For example, a system resource can include one or more memories and/or one or more peripheral devices. Via an access right, a system module can be permitted to access a system resource.

A "memory" can be a data storage device or also a data carrier on/in which data is stored (saved). A memory can be read or written by a computer or some kind of peripheral device. A memory can be a semiconductor memory and/or a magnetic memory or a memory based on a technology not named here. A memory can be a volatile memory and/or non-volatile memory. A memory can include for example one of DRAM, RAM, ROM, EPROM, HDD, SDD, . . . on/in which the data are stored.

A "peripheral device" can be a component that can be connected to a (central) computing unit. Such a component may require controlling by the computing unit and, in some cases, an initialization. A peripheral device can include a part of a computer that offers functionalities that cannot be provided by a computing core itself but by additional hardware. For example, a peripheral device may include an analog-to-digital converter (ADC), a timer, or an interface such as a serial peripheral interface (SPI).

A "memory buffer" can be a memory area or an address area in a memory. A memory buffer can be accessed in read and/or write mode using physical or virtual addresses. A memory area or memory buffer may include one address or a contiguous plurality of individual addresses in a memory, where "contiguous" means that individual addresses are adjacent to each other. A memory area or a memory buffer can be identified with a start address and an end address. A memory buffer can be part of a system-internal DRAM. A memory buffer can also be a standalone memory device.

A "descriptor" can be a predetermined designation that can be selected to describe the content of an object. A descriptor may also include an index and be used for information retrieval. A descriptor can stand for a specific memory area, where a memory area can be specified by a start and end address, and contain access rights for that particular memory area.

A "domain controller" can include an extended resource domain controller (XRDC). A domain controller can include peripheral devices implemented in hardware and can manage access rights for, for example, memory units and/or external peripheral devices. A domain controller can segregate different peripheral devices and/or protect the memory of a system, where a domain of a domain controller can be a contiguous area that has equal access rights to peripheral devices and/or memory units.

A "computing core" means the central part of a microprocessor; there may also be a plurality of computing cores in a microprocessor. A computing core can carry out arithmetic and/or logical operations on input data and/or information.

A "memory protection unit" can be a hardware and/or software unit. A memory protection unit can have registers, the registers containing or describing memory areas. A memory protection unit may have its own memory, a pre-configured hardware logic unit, and an internal data connection. A memory protection unit can have an interface to the outside, for example to a computing core or communication connection. A memory protection unit can be part of a processor (central processing unit, CPU).

A "vehicle" can be any device that transports passengers and/or freight. A vehicle can be a motor vehicle (for example, a car or a truck), but also a rail vehicle. A vehicle can also be a motorized, non-motorized, and/or muscular force-powered two- or three-wheeled vehicle. However, floating and flying devices can also be vehicles. Vehicles can operate at least semi-autonomously or in assisted fashion.

A "function" can be any subtask performed during the operation of a device. A function can relate to the control, regulation, or monitoring of the device or of a part of the device (e.g. a component of the device). Additionally or alternatively, a function can relate to the data processing or signal processing in the device (e.g. a communication function).

DETAILED DESCRIPTION OF EXAMPLE EMBODIMENTS

Figure 1A:
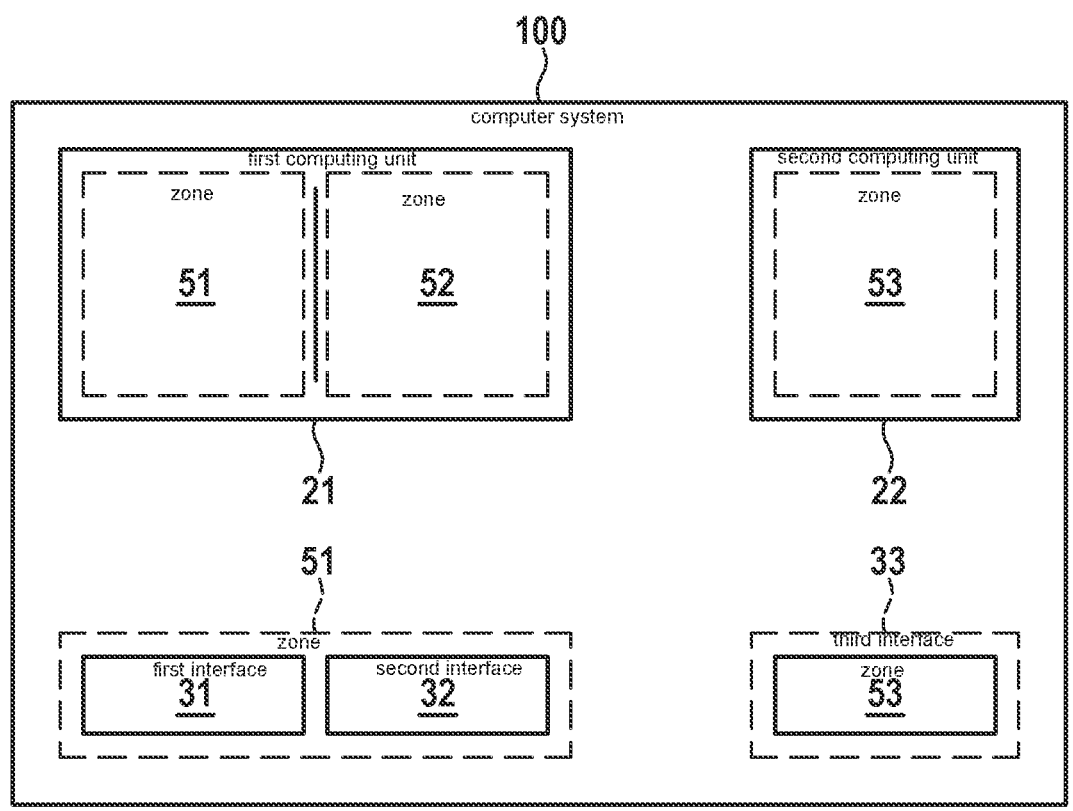
FIGS. 1A and 1B schematically illustrate an exemplary embodiment of a system for providing a plurality of functions for a device, according to the present invention.

Disclosed is a computer system 100 for providing a plurality of functions for a device, in particular for a vehicle, the computer system having a plurality of system modules and the plurality of system modules being configured to provide functions that are differently critical for the operational security of the device. Each system module or a part of a system module of the plurality of system modules is assigned to a zone 51, 52, 53 of a plurality of zones. A zone is a logically and/or physically delimitable unit in the computer 100. Here a first zone 51, 52 is more trustworthy than a second, less trustworthy zone 53, the danger of a manipulation of a more trustworthy zone 51, 52 being lower than of a less trustworthy 53. A manipulation can include an external attack that reduces operational security. FIG. 1A shows an exemplary embodiment of the system 100 with three zones 51, 52, 53. For example, 1, 2, 3, 4, 5, 6, 10, 20 or more zones can be separated in system 100.

The extent to which a zone is more or less trustworthy, i.e. the degree of trustworthiness, can be based on a classification of zones 51, 52, 53 on the basis of a security level. The computer system of the present disclosure can have at least two security levels, but can also have more than two security levels (e.g. more than five). The degree of trustworthiness or the security level can be determined by the configuration of the corresponding zone (e.g. the system modules contained therein). For example, the degree of security, or the extent of security measures with which the system modules of a zone 51, 52, 53 are protected for example against manipulation, for example in the context of an external attack, can determine whether a zone 51, 52, 53 is more trustworthy or less trustworthy, or what security level it has (e.g. the presence of certain hardware- and/or software-based security measures in the system modules of the zone). In addition, for example the extent of communication of the system modules situated in the corresponding zone with external systems such as a backend can determine what degree of trustworthiness a zone has, or what security level it has. For example, a zone that communicates predominantly or exclusively within the computer system may be more trustworthy than a zone that communicates at least partly with external systems (e.g. a backend, other devices such as vehicles, or infrastructure components). In some examples, with regard to their trustworthiness the zones are divided into non-trustworthy zones and trustworthy zones. A more trustworthy zone 51, 52 as described herein may for example be trustworthy, and a less trustworthy zone 53 as described herein may for example be nontrustworthy. A computer system 100, for example a computer system of a vehicle, may for example be the target of a cyberattack, whereby security-critical functions, such as a braking function in a vehicle, may be disabled or manipulated such that a hazardous situation may arise. A more trustworthy zone 51, 52 here is a zone whose manipulation is less probable than the manipulation of a less trustworthy zone 53. For example, a zone 53 that includes multimedia functions and has many interfaces for communication with a backend may be a less trustworthy zone 53, because the probability of an external attack on a communication channel to the backend is higher than for a zone 51 that includes predominantly functions that only require information from within the vehicle and/or only carry out processes within the vehicle.

Further, a first more critical function of the plurality of functions is provided by a system module of the first zone 51 and a less critical function of the plurality of functions is provided by a system module of the second zone 53. In addition to the classification of zones 51, 52, 53 according to a degree of trustworthiness, i.e. a safety level, the zones are also classified with regard to their relevance for operational security (e.g. using a safety level), i.e. the criticality of the zone's function for the operational security of the device. A zone 51, the manipulation of which can lead to a serious hazardous situation, is here more critical than a zone 53 the manipulation of which can lead to no serious hazardous situation, or can lead to a less serious hazardous situation. For example, a zone 53 that includes multimedia functions may be less critical than a zone 51 that includes for example a braking function. In the above example, the probability of a hazardous situation being produced by the failure of the music in the interior of a vehicle is less than the probability that non-functioning of the brakes of a vehicle can cause a hazardous situation. A classification of the zones 51 based on a safety level or relevance for the operational security of the device can be carried out in any suitable manner. In some examples, the classification can take place using the Automotive Safety Integrity Level (ASIL) classification, where the classification can include five levels (QM (least critical), ASIL-A, ASIL-B, ASIL-C, and ASIL-D (most critical)). For example, the relevance, i.e., criticality, of a zone for the operational security can be derived from the severity, frequency, and/or the controllability of a safety hazard in the respective zone.

In some examples, one or more trustworthy zones 51, 52 may be formed on a first computing unit 21 of a computer system 100 and one or more less trustworthy zones 53 may be formed on a second computing unit 22 of the computer system 100. FIG. 1A shows, as an example, a computer system 100 that has a first computing unit 21 and a second computing unit 22. For example, computer system 100 can include a (central) vehicle computer (e.g. a vehicle computer can form computer system 100). In other examples, computer system 100 includes an embedded system (e.g. an embedded system can form computer system 100). An embedded system is an electronic computer that is integrated into a technical context. An embedded system can perform regulation, control, monitoring functions or data processing tasks. In other examples (or in addition), computer system 100 can include one or more control devices (ECUs) (e.g. one or more ECUs can form computer system 100).

For example, a first trustworthy zone 51 and a second trustworthy zone 52 may be formed on the same computing unit 21, and a third untrustworthy zone 53 may be formed on the second computing unit 22. For example, zones 51 and 52 may be logically separated from each other on a software basis. In some examples, the third zone 53 may be physically, i.e., locally, separated from the first zone 51 and/or the second zone 52 by its formation on a second computing unit 22.

Figure 1B:
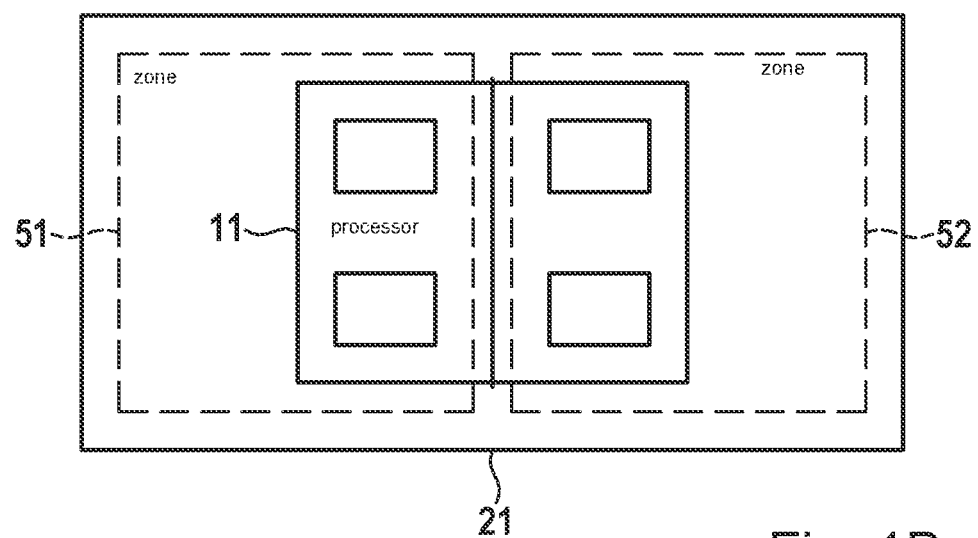

In some examples, a system module can include for example a processor 11, an interface 31, and/or a network component. For example, ≥1, ≥2, ≥3, ≥4, ≥5, ≥6, ≥10, ≥20 or more system modules (e.g. processors) or parts thereof (e.g. computing cores) may be situated in a zone. In FIG. 1B, first zone 51 may include a part (e.g. two computing cores) of the plurality of computing cores of a processor 11 (e.g. four computing cores) and second zone 52 may include another part (e.g. two remaining computing cores) of the plurality of computing cores of processor 11. In some examples, a system module can include interfaces, bus system, or parts thereof. FIG. 1A shows as an example first zone 51, which includes a first interface 31 and a second interface 32, and third zone 53, which includes a third interface 33. For example, an interface may include a CAN bus interface, a CAN FD bus interface, and/or a GMAC port. For example, a system module assigned to a first zone can include a first software architecture and another system module assigned to a second zone can include a second software architecture. For example, a part of a system module assigned to a first zone can include a first software architecture and another part of the system module assigned to a second zone can include a second software architecture.

Figure 2A:
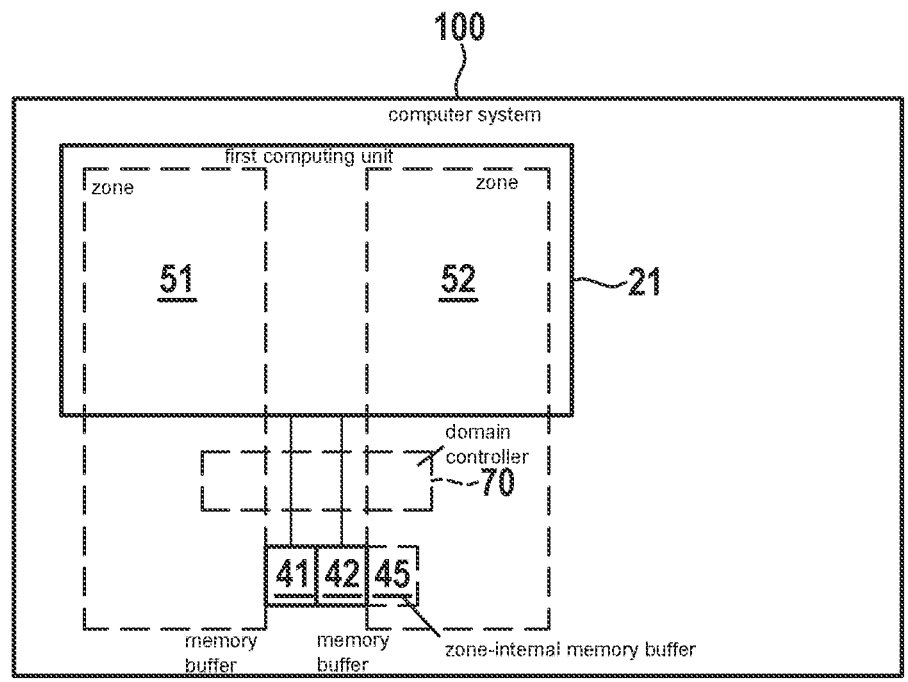
FIG. 2A illustrates an exemplary embodiment of the system for providing a plurality of functions for a device, having a first memory buffer and a second memory buffer for exchanging data between the zones, according to the present invention.
Figure 2B:
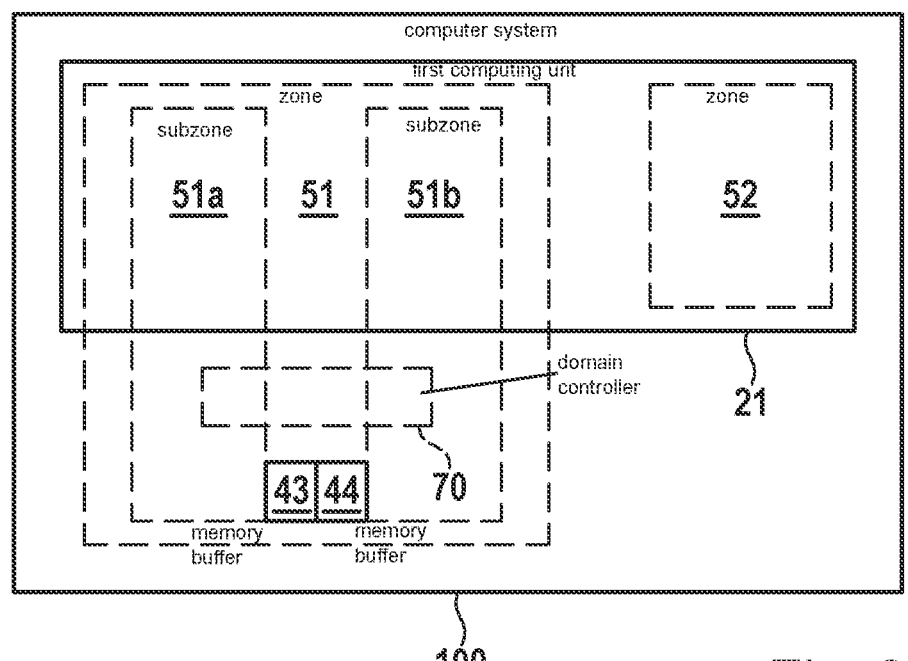
FIG. 2B illustrates an exemplary embodiment of the system for providing a plurality of functions for a device, having two subzones in a first zone and a first memory buffer and a second memory buffer for exchanging data between the subzones, according to the present invention.

In some examples, as shown as an example in FIGS. 2A and 2B, a memory buffer 41 configured to be used in read mode by a first zone 51 and in write mode by a second zone 52, and a memory buffer 42 configured to be used in write mode by first zone 51 and in read mode by second zone 52, can each be situated between two zones 51, 52 for data exchange. In some examples, a memory buffer 41 can be a memory area in a memory device. For example, a memory buffer 41 can be a memory area in a dynamic random access memory (DRAM) or can include another memory or be situated therein. For example, individual access rights can be assigned to each of the memory buffers 41 in order to allow the individual zones to have read-only or write-only access, depending on the memory buffer 41. In some examples, individual access rights can be assigned to each of the memory buffers 41 in order to allow the individual zones 51 to have read and write access depending on the memory buffer 41. For example, a separation of the memory buffers 41 from each other and/or shielding from each other and/or assignment of access rights can be provided, for example implemented by a memory protection unit (MPU). Further, at least one zone 51 may have at least one zone-internal memory buffer 45 of its own that is not used to exchange data with other zones 51.

Figure 3:
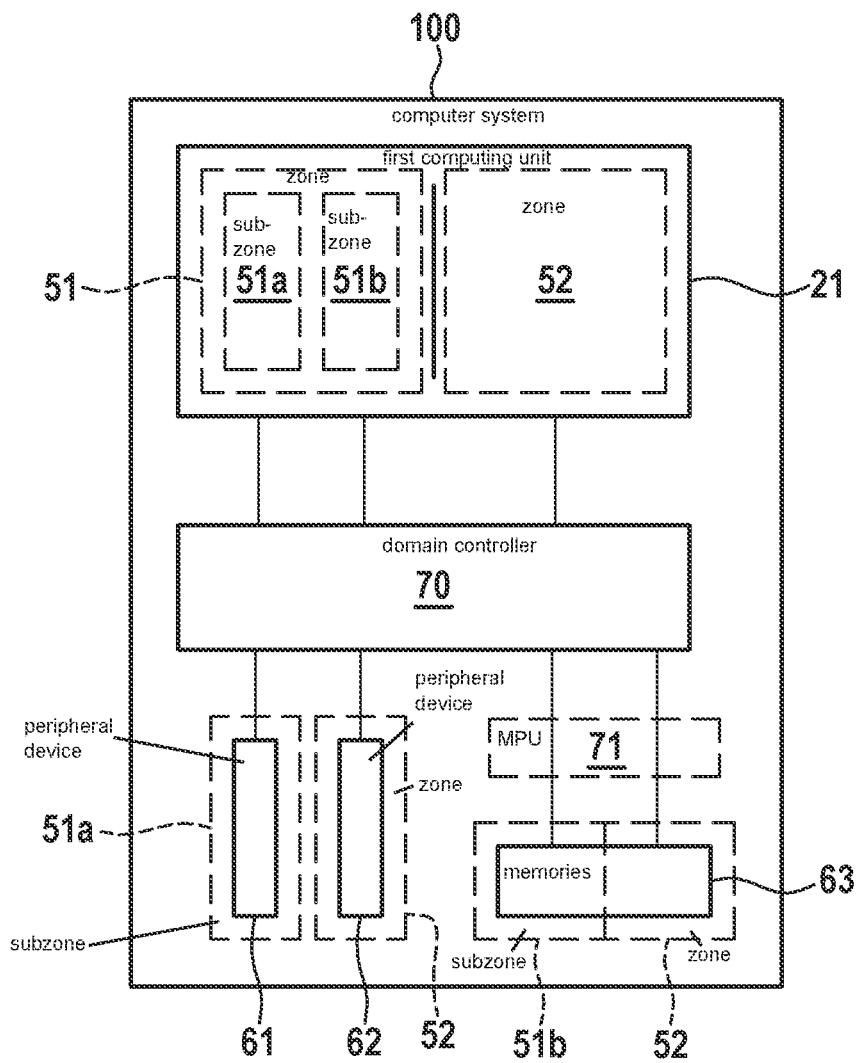
FIG. 3 illustrates an exemplary embodiment of the system for providing a plurality of functions for a device, having a domain controller, according to the present invention.

In some examples, as shown in FIG. 3, at least one zone 51 of the plurality of zones may be divided into at least two subzones 51a, 51b, the subzones 51a, 51b each including a part of the one or more system modules of the corresponding zone 51, and the zones and/or subzones being assigned different access rights to system resources, system resources including peripheral devices 61, 62 and/or memories 63 of the system. For example, a zone 51 can be divided into ≥2, ≥3, ≥4, ≥5, ≥6, ≥10, ≥20 or more subzones 51a. For example, a zone 51 can include a processor having a plurality of computing cores (e.g. four computing cores). A first part of the computing cores (e.g. two computing cores) can for example be assigned to a first subzone 51a, and the remaining computing cores (e.g. two computing cores) can for example be assigned to a second subzone 51b. For example, a first software application can be executed on a computing core of the processor assigned to the first subzone 51a and a second software application can be executed on at least one computing core assigned to the second subzone 51b. For example, equal access rights to one or more memories 63 and/or peripheral devices 61, 62 of system 100 can be assigned to a subzone 51a; that is, the system modules (e.g. processors) or parts thereof (e.g. computing cores) assigned to a common subzone 51a may be assigned the same access rights to system resources that include for example memories 63 and/or peripheral devices 61, 62. For example, the system modules or parts thereof assigned to a common zone 51 can be assigned the same access rights to system resources. In some examples, the access rights to system resources can be assigned on the basis of the principle of least privilege (PoLP). This means that the zones and/or subzones each have access rights only to the system resources that they require to perform their tasks. This means that the system modules assigned to the zones and/or subzones each have access rights only to the system resources that they require to provide the respective functions. For example, the system 100 can include a domain controller 70. By means of the domain controller 70, in some examples zones 51 can be divided into subzones 51a and/or access rights to peripheral devices 61, 62 and/or memories 63 can be assigned to zones 51 and/or subzones 51a. For example, in one subzone 51a of the at least two subzones 51a, 51b, a system module and/or a part of a system module can include a first software architecture, and in the other subzone 51b of the at least two subzones 51a, 51b a system module and/or a part of a system module can include a second software architecture. For example, in one subzone 51a of the at least two subzones 51a, 51b, a system module and/or a part of a system module may include an AUTOSAR classic software architecture, and in the other subzone 51b of the at least two subzones 51a, 51b, a system module and/or a part of a system module may include an AUTOSAR adaptive software architecture. For example, in one subzone 51a of the at least two subzones 51a, 51b, a system module and/or a part of a system module may be configured to execute a first operating system and in the other subzone 51b of the at least two subzones 51a, 51b, a system module and/or a part of a system module may be configured to execute a second operating system (e.g., Linux).

In some examples, as shown in FIG. 3, a memory buffer 42 configured to be used in read-only mode by one subzone 51a and in read-and-write mode by the other subzone 51b and a memory buffer 43 configured to be used in read-and-write mode by one subzone 51a and in read-only mode by the other subzone 51b can each be situated between two subzones 51a, 51b for data exchange. In some examples, a memory buffer 42 configured to be used in read mode by one subzone 51a and in write mode by the other subzone 51b and a memory buffer 43 configured to be used in write mode by one subzone 51a and in read mode by the other subzone 51b can each be situated between two subzones 51a, 51b for data exchange. For example, a memory buffer 43 can include a dynamic random access memory (DRAM) or another memory or can be situated therein. For example, individual access rights can be assigned to each of the memory buffers 43 in order to allow the individual subzones 51a to have read-only access, write-only access, or read and write access, depending on the memory buffer 43. For example, a separation of the memory buffers 43 from each other and/or shielding from each other and/or assignment of access rights can be provided, for example implemented by a memory protection unit (MPU).

In some examples, a memory buffer (41, 42, 43, 44) can be a memory area in a memory (63). In addition, in some examples each memory area may have a descriptor assigned to it. The descriptor can specify the start and end address of the memory area. In some examples, a descriptor can be activated for the zones 51 or subzones 51a that are allowed access to the memory area that corresponds to the descriptor. For example, the descriptor can include an access guideline (for example, an access control policy (ACP)) for each zone 51 and/or subzone 51a that includes information about whether and what type of access right (for example, read/write or read and write) are assigned to the respective zone 51 and/or subzone 51a for the memory area that corresponds to the descriptor.

In some examples, a verification and/or validation of data may be optional in a data exchange between two more trustworthy zones 51, 52. In some examples, a verification and/or validation of data may be optional in a data exchange between two subzones 51a, 51b. For example, a verification and/or validation of data in a data exchange can lead to a slowdown, i.e. to a reduction in the performance of the data exchange. In some examples, a verification and/or validation can be carried out with a variable scope. For example, a verification and/or validation of data of a data exchange between two more trustworthy zones 51, 52 or between two subzones 51a, 51b can be carried out on the basis of a necessary performance (e.g. necessary time duration until a (approximately) complete data exchange has taken place). For example, an intensive (i.e. accurate) verification and/or validation of data may result in lower performance (i.e. a slower data exchange) than a less intensive (i.e. less accurate) verification and/or validation of data. For example, a "zero trust" approach can be implemented using verification/validation of data in the case of a data exchange between two more trustworthy zones 51, 52 or between two subzones 51a, 51b.

In some examples, a verification and/or validation of data may be mandatory in the case of a data exchange between a more trustworthy zone 51 and a less trustworthy zone 53. For example, the danger of a manipulation of a less trustworthy zone 53 may be higher than of a more trustworthy zone 51. A mandatory verification/validation of the data in a data exchange between a more trustworthy zone 51 and a less trustworthy zone 53 can be mandatory in order to reduce the danger of a manipulation of the more trustworthy zone 51 by a corrupted less trustworthy zone 53 and/or the forwarding of manipulated data from a less trustworthy zone 53 to a more trustworthy zone 51. For example, a verification and/or validation of the data may be carried out during an exchange of data between a more trustworthy zone 51 and a less trustworthy zone 53 independently of a performance of the verification and/or validation.

In some examples, as noted above, the system can include a domain controller 70 that contains a plurality of domains. In addition, at least one domain may be assigned at least one zone 51 and/or subzone 51a. In addition, a domain can have equal access rights to system resources. A domain controller 70 can include an extended resource domain controller (XRDC). A domain can include a logical/physical area that has equal access rights to memories 63 and/or peripheral devices 62. A domain controller 70 can contain ≥1, ≥2, ≥3, ≥4, ≥5, ≥6, ≥7, ≥8 or more domains. In some examples, a domain may be assigned a trustworthiness/security level. For example, a first domain (e.g. domain 0) of a plurality of domains (for example eight domains) may be assigned a lower trustworthiness than an eighth domain (e.g. domain 7). In some examples, zones 51, 52, 53 and/or subzones 51a may be assigned to a domain with the same access rights to system resources (e.g. memories 63, peripheral devices 61, 62). That is, in some examples, system modules and/or parts of system modules with the same access rights can be assigned to a domain, or the system modules and/or parts of system modules that require the same access rights to system resources in order to provide the corresponding functions can be assigned to a domain. In some examples, the domain controller can be configured to allow or forbid accesses by system modules to system resources; that is, to monitor the accesses to system resources. In some examples, in addition to the domain controller 70, a memory protection unit 71 (MPU) can be situated in computer system 100 and configured to permit or prohibit, i.e., to monitor, access to memories 63 and/or peripheral devices 61, 62, in addition to domain controller 71. In some examples, memory protection unit 71 can prevent unauthorized access by a zone 51 and/or subzone 51a to a system resource for which no access rights have been assigned to the corresponding zone 51 or subzone 51a. For example, in the event of a failure of domain controller 70, memory protection unit 71 can be used to increase the reliability and security against failure of the system. For example, the additional use of a memory protection unit 71 may be part of a staggered defense strategy or a defense-in-depth strategy.

Figure 4:
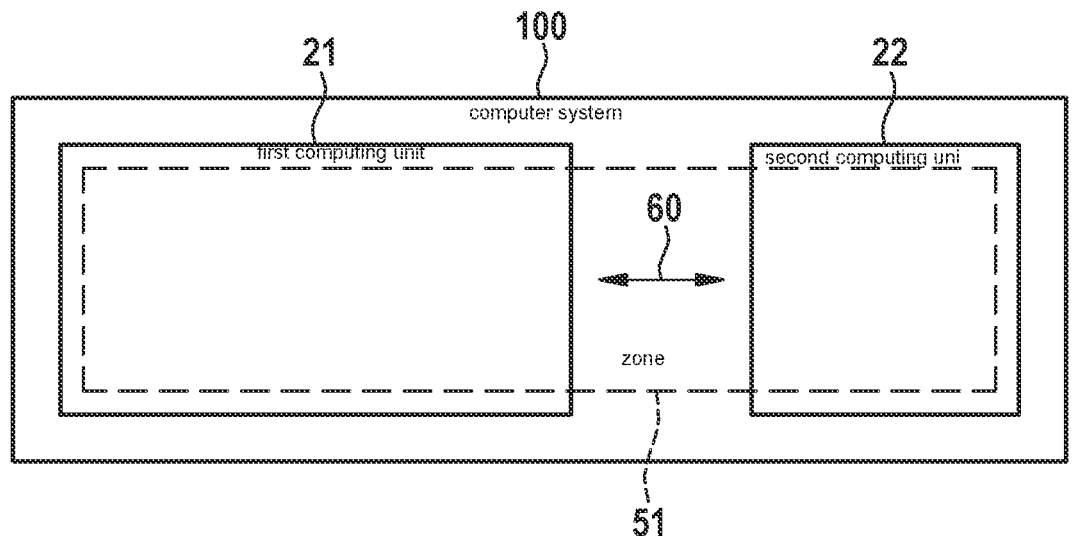
FIG. 4 illustrates an exemplary embodiment of the system for providing a plurality of functions for a device, having a zone formed on two computing units, according to the present invention.

In some examples, as shown as an example in FIG. 4, a zone 51 can be formed on a plurality of computing units 21, 22. In addition, a data exchange between the computing units (21, 22) can be configured to use cryptographic encryption and/or TLV structures. For example, a communication channel 60 may be provided that enables an authentic, integral, secure, and/or confidential data exchange between computing units 21, 22. In other words, a communication channel 60 may be situated between the computing units 21, 22 that has characteristics that reduce the probability of a manipulation by an external attack that degrades the functionality and/or the operational reliability of the system. For example, cryptographic encryption may include cryptographic network protocols, such as MACSec, IPSec, SEcOC. In some examples, a data exchange may be implemented using TLV (Type, Length, Value) structures. The TLV structures can be combined with cryptographic encryption methods in some examples, for example in order to ensure authenticity and integrity of the data. For example, TLV structures can be extended with MAC tags for this purpose. In some examples, the TLV structures may be combined with Authentic Encryption (AE) algorithms or Authentic Encryption with Associated Data (AEAD) algorithms, for example to ensure data confidentiality.

In some examples, system modules or parts of system modules of the plurality of system modules that are not assigned to a zone 51 may be assigned to a domain that has no access rights to system resources. For example, a grouping of the system modules (e.g. processors) or parts thereof (e.g. individual computational cores) that are not needed in the system in one domain can reduce the possibilities for manipulation by an external attack. For example, the domain to which the system modules or parts thereof are assigned may not be assigned access rights to system resources (for example, memory 63 and/or peripheral devices 61, 62). For example, a grouping of the system modules or parts thereof that are not needed in the system in one domain can be used to separate the corresponding system modules from system modules assigned to a zone to which access rights to system resources are assigned.

In some examples, the device for which the plurality of functions are provided by computer system 100 can be a vehicle. In some examples, computer system 100 may be situated in the vehicle (for example in the form of a vehicle computer). Additionally or alternatively, one or more functions of the plurality of functions can include functions for the operation of a vehicle or one of its components (e.g. control functions, regulating functions, monitoring functions, and/or data processing or signal processing functions). For example, one or more functions of the plurality of functions may be functions for autonomous and/or assisted driving. Alternatively or additionally, a function may be an engine controlling, a transmission controlling, a power train control function, a brake controlling, a battery management function, a human-machine interface controlling, a function for systems of the vehicle interior (e.g. an air conditioning function or a seat control), or a communication function.

In other examples, the device for which the plurality of functions are provided by computer system 100 can be a robot. In still other examples, the device for which the plurality of functions are provided by computer system 100 can be an industrial machine or industrial plant. In still other examples, the device for which the plurality of functions are provided by computer system 100 can be a building technology system.

Also disclosed is a method for using functions provided by a computer system 100. The method can include the use by a user of a first function that is more critical for the operational reliability of the device, the first function being provided by a system module of a more trustworthy zone. Further, the method can include the use by a user of a second function that is less critical for the operational security of the device, the second function being provided by a system module of a less trustworthy zone. For example, a user can use a braking function that is critical to operational safety in a vehicle, the braking function being provided by, for example, a system module assigned to a trustworthy zone. For example, a user can use a multimedia function that is only slightly critical for operational safety in a vehicle, the multimedia function being provided by, for example, a system module assigned to a non-trustworthy zone.

Also disclosed is a computer-implemented method 200 for enforcing a zone separation 100 in a computer system for providing a plurality of functions for a device, in particular for a vehicle, the computer system 100 having a plurality of system modules and a plurality of system resources, and the plurality of system modules carrying out functions that are differently critical for the operational security of the device.

Figure 5:
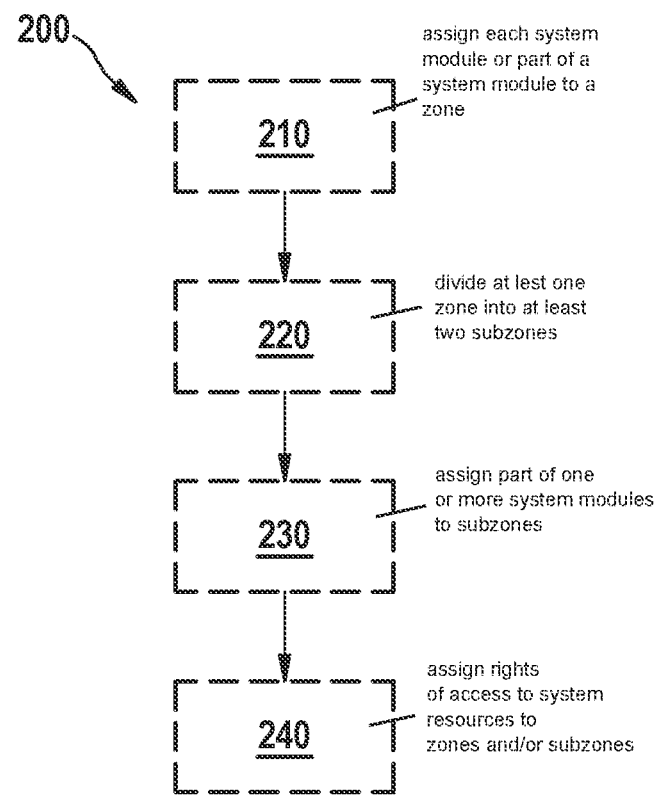
FIG. 5 illustrates, by way of example, method steps for enforcing a zone separation in a computer system for providing a plurality of functions for a device, according to the present invention.

The method is shown as an example in FIG. 5. The method can include assignment 210 of each system module or a part of a system module of the plurality of system modules to a zone 51, 52, 53 of the plurality of zones. Here a first zone 51, 52 is more trustworthy than a second, less trustworthy zone 53, the danger of a manipulation of a more trustworthy zone 51, 52 being lower than of a less trustworthy zone 53. A manipulation can here include an external attack that reduces the operational security. Further, a first more critical function of the plurality of functions is provided by a system module of the first zone and a less critical function of the plurality of functions is provided by a system module of the second zone. The method can further include dividing 220 at least one zone 51 of the plurality of zones into at least two subzones 51a, 51b. The method can further include the assigning 230 in each case of a part of the one or more system modules of the corresponding zone 51 to the subzones 51a, 51b. The method can further include the assigning 240 of rights of access to system resources to the zones 51, 52, 53 and/or subzones 51a, 51b, system resources including peripheral devices and/or memories of the system.

The method can be carried out by computer system 100 in some examples. In some examples, the method for enforcing a zone separation may be performed by another computer system.

In some examples, a computer program can perform the computer-implemented method for zone separation. Further, in some examples a computer-readable medium or signal can store and/or contain the computer program that carries out the computer-implemented method for zone separation, or a part thereof. The medium can include for example one of RAM, ROM, EPROM, HDD, SDD, . . . on/in which the signal is stored.

What is claimed is:

1. A computer system comprising:
   a plurality of system modules formed of at least one of a processor and software by which a plurality of functions, which are assigned different levels of required operational security, are implemented, wherein each system module of the plurality of system modules is assigned to one respective zone of a plurality of zones for access to the respective system module by the assigned zone, each zone being a delimitable unit in the computer system;
   wherein:
      the plurality of zones are hierarchically arranged such that (I) the plurality of zones include zones at a first hierarchical level associated with a first degree of trustworthiness provided by implementation of one or more predefined cyber-attack prevention controls and zones at a second hierarchical level that is lower than the first hierarchical level and that are associated with a second degree of trustworthiness that is less than the first degree of trustworthiness due to operation without the one or more predefined cyber-attack prevention controls and (II) the zones at the second hierarchical level are nested within the zones that are at the first hierarchical level;
      respective levels of access to system resources that are provided to different ones of the zones are dependent upon their respectively associated degrees of trustworthiness; and
      inter-zone communications between different ones of the zones are controlled:
         according to the hierarchical arrangement of the zones, such that:
            for each of the lower level zones, communication of the respective lower level zone with other ones of the zones (I) within which the respective lower level zone is not nested and (II) that are external to the higher level zone within which the respective lower level zone is nested must be routed the higher level zone within which the respective lower level zone is nested; and
            for each of one or more of the lower level zones, access to one of the system resources is controlled so that the resource is accessible by the respective lower level zone only via a respective one of the higher level zones into which the respective lower level zone is nested; and
         such that for a pair of the zones that are of a same one of the hierarchical levels, communications between the zones of the pair is restricted to occur via a pair of memory buffers, with one of the memory buffers being assigned for write access to only a first one of the zones of the pair and being readable by a second one of the zones of the pair and with another of the memory buffers being assigned for write access to only the second one of the zones of the pair and being readable by the first one of the zones of the pair.

2. The computer system as recited in claim 1, wherein the computer system is integrated in a vehicle.

3. The computer system as recited in claim 1, wherein the plurality of zones are distributed over a plurality of hardware components of the computer system.

4. The computer system as recited in claim 1, wherein each system module includes the processor.

5. The computer system as recited in claim 1, wherein the one of the memory buffers is configured for write-only access by the first one of the zones of the pair, and the another of the memory buffers is configured for write-only access by the second one of the zones of the pair.

6. The computer system as recited in claim 1, wherein at least one of the zones of the pair has at least one zone-internal memory buffer that is not accessible by any other zone of the plurality of zones.

7. The computer system as recited in claim 1, wherein the resource is a peripheral device of the computer system and/or a memory of the computer system.

8. The computer system as recited in claim 7, wherein each of at least two of the lower level zones that are nested within a single one of the higher level zones includes a respective software module, the respective software modules being respective ones of the plurality of system modules.

9. The computer system as recited in claim 7, wherein the one of the, memory buffers is configured for read-and-write access by the first one of the zones of the pair, and the another of the memory buffers is configured for read-and-write access by the second one of the zones of the pair.

10. The computer system as recited in claim 9, wherein each of the memory buffers is memory area in a memory and each memory area is assigned a descriptor that is activated for the zone for which access to the memory area corresponding to the descriptor is allowed.

11. The computer system as recited in claim 7, wherein the computer system has a domain controller that contains a plurality of domains and at least one domain is assigned at least one of the zones, and each domain has equal access rights to system resources.

12. The computer system as recited in claim 1, wherein a verification and/or validation of data is mandatory in the case of a data exchange between different ones of the zones whose respectively associated degrees of trustworthiness differ from one another.

13. The computer system as recited in claim 1, wherein a single one of the plurality of zones is distributed over a plurality of hardware components of the computer system, and the computer system is configured for a data exchange between the plurality of hardware components using cryptographic encryption and/or TLV structures.

14. The computer system as recited in claim 1, wherein the computer system is situated in a vehicle, and the plurality of functions are executed as part of autonomous and/or assisted driving.

15. A method using a computer system, the computer system including a plurality of system modules formed of at least one of a processor and software by which a plurality of functions, which are assigned different levels of required operational security, are implemented, wherein each system module of the plurality of system modules is assigned to one respective zone of a plurality of zones for access to the respective system module by the assigned zone, each zone being a delimitable unit in the computer system, wherein: (I) the plurality of zones are hierarchically arranged such that (I) the plurality of zones include zones at a first hierarchical level associated with a first degree of trustworthiness provided by implementation of one or more predefined cyber-attack prevention controls and zones at a second hierarchical level that is lower than the first hierarchical level and that are associated with a second degree of trustworthiness that is less than the first degree of trustworthiness due to operation without the one or more predefined cyber-attack prevention controls and (II) the zones at the second hierarchical level are nested within the zones that are at the first hierarchical level; (II) respective levels of access to system resources that are provided to different ones of the zones are dependent upon their respectively associated degrees of trustworthiness; and (III) inter-zone communications between different ones of the zones are controlled: (i) according to the hierarchical arrangement of the zones, such that: (a) for each of the lower level zones, communication of the respective lower level zone with other ones of the zones (1) within which the respective lower level zone is not nested and (2) that are external to the higher level zone within which the respective lower level zone is nested must be routed the higher level zone within which the respective lower level zone is nested; and (b) for each of one or more of the lower level zones, access to one of the resources is controlled so that the resource is accessible by the respective lower level zone only via a respective one of the higher level zones into which the respective lower level zone is nested; and (ii) such that for a pair of the zones that are of a same one of the hierarchical levels, communications between the zones of the pair is restricted to occur via a pair of memory buffers, with one of the memory buffers being assigned for write access to only a first one of the zones of the pair and being readable by a second one of the zones of the pair and with another of the memory buffers being assigned for write access to only the second one of the zones of the pair and being readable by the first one of the zones of the pair, the method comprising the following steps:

based on a predefined restriction of execution of a first one of the plurality of functions with a first predefined operational security requirement, executing the first function using one of the zones that are associated with the first degree of trustworthiness; and based on a predefined restriction of execution of a second one of the plurality of functions with a second predefined operational security requirement, executing the second function using one of the zones that are associated with the second degree of trustworthiness.

16. A computer-implemented method for enforcing a zone separation in a computer system, the computer system having a plurality of system resources and a plurality of system modules formed of at least one of a processor and software by which a plurality of functions, which are assigned different levels of required operational security, are implemented, the method comprising the following steps:

assigning each system module of the plurality of system modules to one respective zone of a plurality of zones for access to the respective system module by the assigned zone, each zone being a delimitable unit in the computer system;

dividing the plurality of zones into a hierarchical arrangement such that (I) the plurality of zones include zones at a first hierarchical level associated with a first degree of trustworthiness provided by implementation of one or more predefined cyber-attack prevention controls and zones at a second hierarchical level that is lower than the first hierarchical level and that are associated with a second degree of trustworthiness that is less than the first degree of trustworthiness due to operation without the one or more predefined cyber-attack prevention controls and (II) the zones at the second hierarchical level are nested within the zones that are at the first hierarchical level;

assigning respective levels of access to the system resources to different ones of the zones according to their respectively associated degrees of trustworthiness; and controlling inter-zone communications between different ones of the zones:

according to the hierarchical arrangement of the zones, such that:

for each of the lower level zones, communication of the respective lower level zone with other ones of the zones (I) within which the respective lower level zone is not nested and (II) that are external to the higher level zone within which the respective lower level zone is nested must be routed the higher level zone within which the respective lower level zone is nested; and for each of one or more of the lower level zones, access to a resource of the system resources is controlled so that the resource is accessible by the respective lower level zone only via a respective one of the higher level zones into which the respective lower level zone is nested; and such that for a pair of the zones that are of a same one of the hierarchical levels, communications between the zones of the pair is restricted to occur via a pair of memory buffers, with one of the memory buffers being assigned for write access to only a first one of the zones of the pair and being readable by a second one of the zones of the pair and with another of the memory buffers being assigned for write access to only the second one of the zones of the pair and being readable by the first one of the zones of the pair;

wherein the system resources include peripheral devices of the computer system and/or memories of the system.

17. The method as recited in claim 16, wherein the computer system is integrated in a vehicle.

\* \* \* \* \*